United States Patent
Yang (10) Patent No.: US 9,333,420 B2
(45) Date of Patent: May 10, 2016

(54) COMPUTER READABLE MEDIUM RECORDING SHOOTING GAME

(71) Applicant: FOURTHIRTYTHREE INC., Seoul (KR)

(72) Inventor: Gwi Seong Yang, Seoul (KR)

(73) Assignee: FOURTHIRTYTHREE INC., Seoul (KR)

( * ) Notice: Subject to any disclaimer, the term of this patent is extended or adjusted under 35 U.S.C. 154(b) by 82 days.

(21) Appl. No.: 14/076,590

(22) Filed: Nov. 11, 2013

(65) Prior Publication Data

US 2014/0274239 A1    Sep. 18, 2014

(30) Foreign Application Priority Data

Mar. 12, 2013    (KR) .................. 10-2013-0026238

(51) Int. Cl.
    *A63F 13/00*    (2014.01)
(52) U.S. Cl.
    CPC ...................................... *A63F 13/00* (2013.01)
(58) Field of Classification Search
    None
    See application file for complete search history.

(56) References Cited

U.S. PATENT DOCUMENTS

| | | | |
|---|---|---|---|
| 2004/0063501 A1* | 4/2004 | Shimokawa et al. ........... | 463/49 |
| 2006/0046848 A1* | 3/2006 | Abe et al. ...................... | 463/37 |
| 2006/0128468 A1* | 6/2006 | Yoshikawa et al. ............. | 463/36 |
| 2006/0252540 A1* | 11/2006 | Kando et al. ..................... | 463/36 |
| 2009/0181770 A1* | 7/2009 | Viner et al. ...................... | 463/37 |
| 2010/0178966 A1* | 7/2010 | Seydoux .......................... | 463/2 |
| 2011/0190052 A1* | 8/2011 | Takeda et al. ................... | 463/31 |
| 2011/0287843 A1* | 11/2011 | Yamada et al. ................. | 463/43 |
| 2012/0231883 A1* | 9/2012 | Hayashi et al. ................. | 463/31 |
| 2012/0302345 A1* | 11/2012 | Shikata et al. .................. | 463/36 |
| 2012/0306775 A1* | 12/2012 | Miyachi et al. ............... | 345/173 |
| 2012/0309478 A1* | 12/2012 | Kotsugai et al. .................. | 463/3 |
| 2012/0309518 A1* | 12/2012 | Hansen et al. ................... | 463/31 |
| 2013/0217498 A1* | 8/2013 | Wang .............................. | 463/37 |
| 2013/0252736 A1* | 9/2013 | Akifusa et al. ................. | 463/37 |
| 2013/0288790 A1* | 10/2013 | Wang .............................. | 463/31 |

* cited by examiner

*Primary Examiner* — Tramar Harper
(74) *Attorney, Agent, or Firm* — IPLA P.A.; James E. Bame (57) ABSTRACT

Provided herein is a computer readable medium recording a shooting game. The shooting game includes a character moving module, a screen moving module, a focusing module, and an attack module. The character moving module moves the location of a character. The screen moving module senses the movement of a terminal using a gyrosensor and then moves the game screen depending on the variation in the angle of the terminal. The focusing module senses dragging when a drag icon is dragged. The attack module generates an attack signal to the center of the game screen at the time at which the dragging is terminated. The attack module generates a hitting signal for the character when the character is located at the center of the game screen at the time at which the dragging is terminated, or a preset time after the time at which the dragging is terminated.

10 Claims, 5 Drawing Sheets

COMPUTER READABLE MEDIUM RECORDING SHOOTING GAME

CROSS REFERENCE

This application claims foreign priority under Paris Convention and 35 U.S.C. §119 to Korean Patent Application No. 10-2013-0026238, filed Mar. 12, 2013 with the Korean Intellectual Property Office.

BACKGROUND OF THE INVENTION

1. Field of the Invention

The present invention relates generally to a computer readable medium recording a shooting game and, more particularly, to a computer readable medium recording a shooting game, in which a strong attack can be made because a target is enlarged as in the zoom function of a camera and thus it is possible to more precisely view and then shoot a fatal point if an arrow displayed on a screen of a game is drawn for a long time, but it is difficult to hit the center of the screen because the center moves in sensitive response to the inclination of a terminal as the target is enlarged.

2. Description of the Related Art

The present invention is directed to a computer readable medium recording a shooting game.

As the game industry is developing, demand for a more realistic game environment is growing.

In particular, recently, First-Person Shooter (FPS) games that provide first-person perspective images in order to make users feel as if they are actually present in the games are attracting significant interest.

FPS games display game images, viewed through the eyes of user avatars within the games, on game screens, thereby making users feel as if they are viewing game environments from the points of view of the actual avatars.

However, focusing methods that are currently applied to FPS games are configured to take aim using a magnifying lens in two or three stages without variations in focusing.

Therefore, with regard to FPS game systems having poor simulations of reality, users lose interest because of the limitations of the unified focusing method and game performance method of current FPS game systems.

SUMMARY OF THE INVENTION

Accordingly, the present invention has been made keeping in mind the above problems occurring in the prior art, and an object of the present invention is to provide a computer readable medium recording a shooting game, in which a strong attack can be made because a target is enlarged as in the zoom function of a camera and thus it is possible to more precisely view and then shoot a fatal point if an arrow displayed on a screen of a game is drawn for a long time, but it is difficult to hit the center of the screen because the center moves in sensitive response to the inclination of a terminal as the target is enlarged.

Another object of the present invention is to provide a computer readable medium recording a shooting game, which can differentiate a user who has frequently played the game and thus is accustomed to the adjustment of a target from a user who is not accustomed to the adjustment of a target because, as the target is enlarged, a strong attack can be made but sensitivity to the inclination of a terminal is increased, thereby promoting immersion into the game.

Still another object of the present invention is to provide a computer readable medium recording a shooting game, which provides a staggering effect to a screen of a game using a staggering module as if a character rides a horse, thereby representing a shooting game in a more realistic manner.

Yet another object of the present invention is to provide a computer readable medium recording a shooting game, which applies the effects of various items to each module of a user's own terminal or another terminal, thereby increasing interest in the shooting game.

In accordance with an aspect of the present invention, there is provided a computer readable medium recording a shooting game, including a character moving module configured to move a location of a character displayed on a game screen; a screen moving module configured to sense the movement of a terminal using a gyrosensor contained in the terminal including a touch screen and then move the game screen depending on the variation in the angle of the terminal; a focusing module configured to sense dragging when a drag icon displayed on the touch screen is dragged; and an attack module configured to generate an attack signal to the center of the game screen at the time at which the dragging that is sensed by the focusing module is terminated; wherein the attack module generates a hitting signal for the character when the character is located at the center of the game screen at the time at which the dragging is terminated; or generates a hitting signal for the character when the character is located at the center of the game screen a preset time after the time at which the dragging is terminated.

The focusing module may perform zooming-in around the center of the game screen when the drag icon is dragged; and the drag icon may perform zooming-in in proportion to the distance over which the drag pointer of the drag icon is dragged from its initial location.

The attack module may generate an attack signal by terminating dragging in a state in which zooming-in has been achieved by dragging the drag icon, make an attack, and then return the drag icon to its initial position.

The focusing module may generate an attack icon at the center of the game screen when the drag icon is dragged.

The computer readable medium may further include a staggering module configured to stagger the game screen in vertical and lateral directions; and a game performing module configured to increase a variation in the staggering of the staggering module and a sensitivity of the screen moving module when the focusing module performs zooming-in, and to decrease the variation in the staggering of the staggering module and the sensitivity of the screen moving module when the focusing module performs zooming-out; wherein the variation in staggering is a variation in staggering of the game screen in vertical and lateral directions; and the sensitivity is a value that is obtained by dividing a variation in location at the center of the game screen by the variation in the angle of the terminal.

The game performing module may perform control so that the character module increases the speed of the character when the focusing module performs zooming-in and decreases the speed of the character when the focusing module performs zooming-out The game performing module may increase the variation in the staggering of the staggering module and the sensitivity of the screen moving module for a preset time when a specific gauge of the character reaches a preset numerical value or when an attack is made using a specific item, at a specific location, using a specific skill or by a specific character.

The game performing module may further include an attack item configured to be applied to another terminal that manipulates another character when the other character displayed on a game screen of a user's own terminal is hit; and an equipment item configured to be applied to the user's own terminal that manipulates a user's own character displayed on the game screen of the other terminal; the attack item includes any of a first attack effect of decreasing a zoom-in and zoom-out speed of the focusing module, a second attack effect of increasing the variation in the staggering of the staggering module, a third attack effect of increasing the sensitivity of the screen moving module, and a fourth attack effect of increasing a speed of movement of the user's own character displayed on another terminal; and the equipment item may include any of a first equipment effect of increasing the zoom-in and zoom-out speed of the focusing module, a second equipment effect of decreasing the variation in a location of the staggering module, a third equipment effect of decreasing the sensitivity of the screen moving module, and a fourth equipment effect of decreasing a speed of movement of the other character displayed on the user's own terminal.

The hitting signal may be configured such that the strength of an attack increases in proportion to the zooming-in of the focusing module and the strength of the attack decreases in proportion to the zooming-out of the focusing module.

The attack item may further include a fifth equipment effect of decreasing a strength of the attack attributable to an attack signal generated by the other terminal, in which the strength of the attack is increased when zooming-in is performed and the strength of the attack is decreased when zooming-out is performed within the range from the strength of an attack that is achieved when the focusing module 130 performs maximum zooming-out to the strength of an attack that is achieved when the focusing module 130 performs maximum zooming-in; and the equipment item may further include a fifth attack effect of decreasing a strength of the attack attributable to an attack signal generated by the other terminal, in which the strength of the attack is increased when zooming-in is performed and the strength of the attack is decreased when zooming-out is performed within the range from the strength of an attack that is achieved when the focusing module 130 performs maximum zooming-out to the strength of an attack that is achieved when the focusing module 130 performs maximum zooming-in.

The screen moving module may be configured such that the game screen is moved to the left when the terminal is rotated to the left, to the right when the terminal is rotated to the right, upward when the terminal is rotated upward, and downward when the terminal is rotated downward.

The attack module may generate a hitting signal when a specific region of the character is located at the center of the game screen by the screen moving module, and then make an attack on the character, in which case the body of the character is divided into regions, and reduction rates related to strengths of attacks are applied, and, when the specific region of the character is attacked, the strength of the attack is reduced at a reduction rate corresponding to the region, and then an attack having a reduced strength is made thereon.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention is not limited to the following embodiments, but may be bodied in various different forms. The following embodiments are intended to make the disclosure of the present invention sufficient, and to sufficiently teach those having ordinary knowledge in the field of art to which the present invention pertains the scope of the present invention. The present invention is defined only by the scope of the attached claims. Throughout the specification, like reference symbols designate like components.

Computer readable media recording a shooting game according to embodiments of the present invention will be described in detail with reference to the accompanying drawings.

Figure 1:
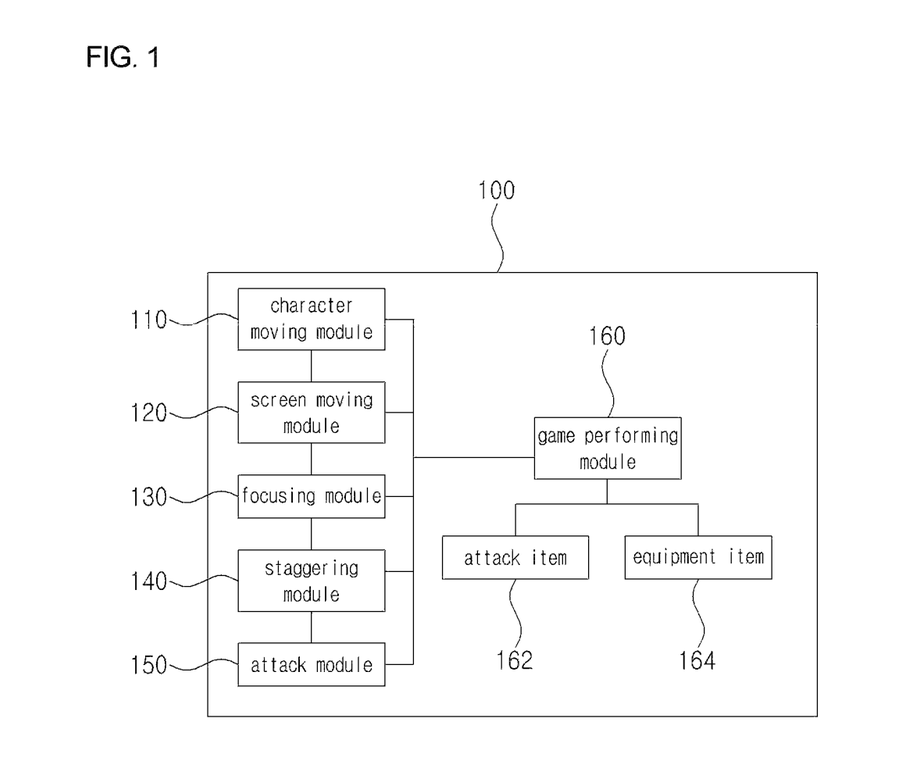
FIG. 1 is a block diagram illustrating the components of a computer readable medium recording a shooting game according to an embodiment of the present invention.
Figure 2:
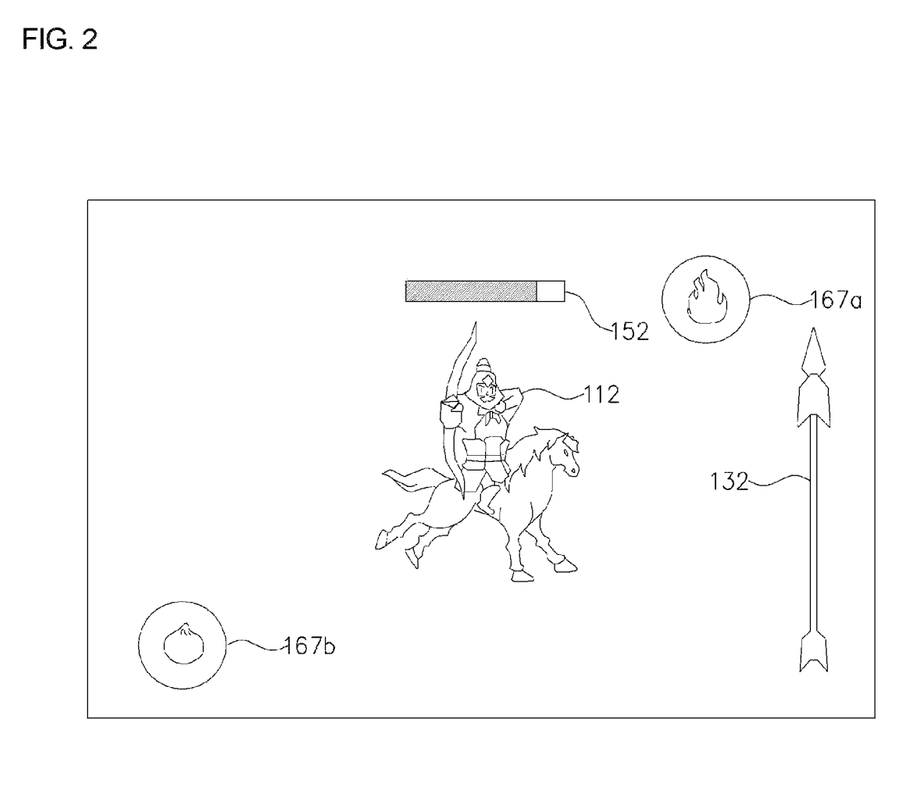
FIGS. 2 to 4 are reference diagrams illustrating variations in a game screen attributable to focusing according to an embodiment of the present invention.
Figure 3:
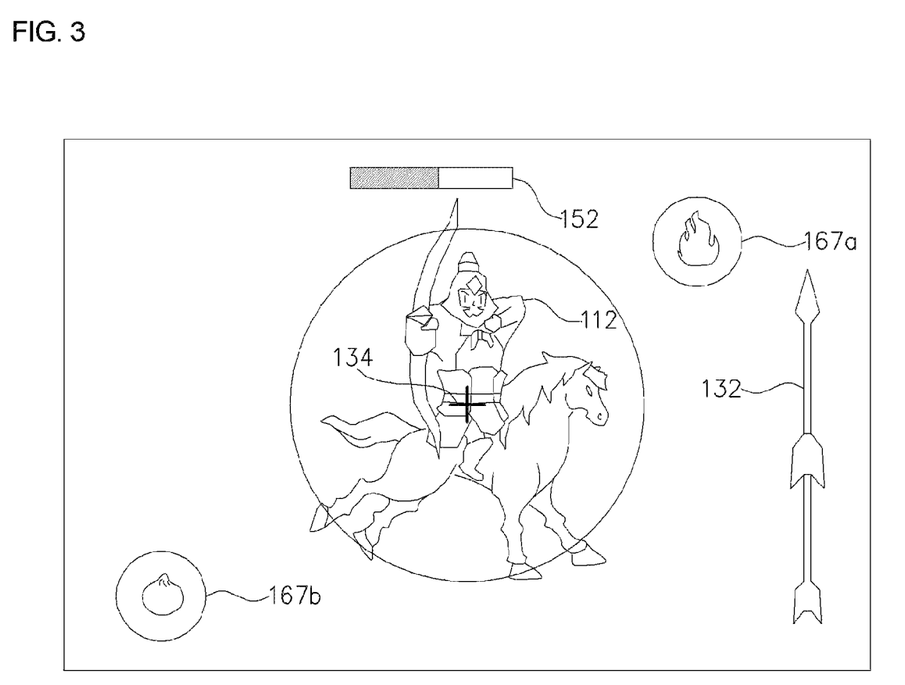
Figure 4:
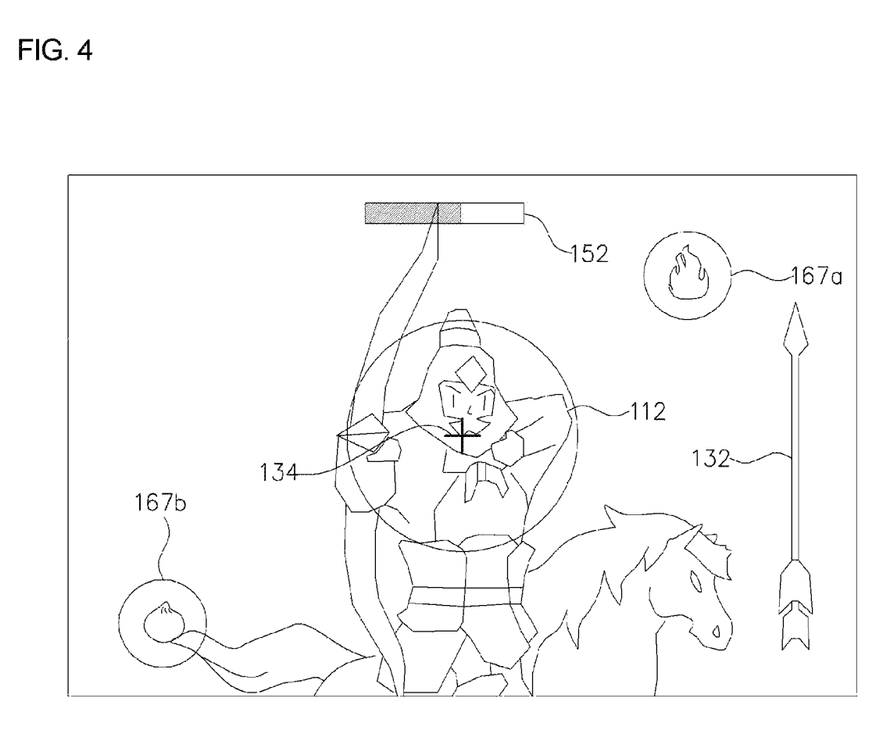

FIG. 1 is a block diagram illustrating the components of a computer readable medium 100 recording a shooting game according to an embodiment of the present invention, and FIG. 2 to FIG. 4 are reference diagrams illustrating variations in a game screen attributable to focusing according to an embodiment of the present invention.

Referring to FIGS. 1 to 4, the computer readable medium 100 recording a shooting game according to this embodiment of the present invention includes a character moving module 110, a screen moving module 120, a focusing module 130, a staggering module 140, an attack module 150, and a game performing module 160.

In this case, the character moving module 110 moves the location of the character 112 displayed on a game screen.

The screen moving module 120 senses the movement of a user's own terminal using a gyro sensor contained in the terminal including a touch screen, and moves the game screen based on the variation in the angle of the terminal.

The screen moving module 120 is configured such that the game screen is moved to the left when the terminal is rotated to the left, to the right when the terminal is rotated to the right, upward when the terminal is rotated upward, and downward when the terminal is rotated downward.

The focusing module 130 performs zooming-in around the center of the game screen when a drag icon 132 is dragged.

In this case, the drag icon 132 performs zooming-in in proportion to the distance over which the drag pointer of the drag icon 132 is dragged from its initial location.

That is, intermediate zooming-in is achieved when the drag pointer stops at the center of the drag icon 132, and maximum zooming-in is achieved when the drag pointer stops at the bottom of the drag icon 132. Meanwhile, when the drag pointer stops at the top of the drag icon 132, minimum zooming-in is achieved.

The focusing module 130 forms an attack icon 134 at the center of the game screen when the drag icon 132 is dragged.

The staggering module 140 assigns a staggering effect to the game screen by staggering the game screen in a vertical or lateral direction.

In this case, the staggering module 140 increases the variation in staggering that staggers the game screen in a vertical direction when zooming-in is performed via the focusing module 130, and decreases the variation in staggering when zooming-out is performed via the focusing module 130.

The attack module 150 generates an attack signal at the center of a game screen at the time at which the dragging sensed by the focusing module 130 is terminated.

Furthermore, the attack module 150 generates a hitting signal for the character 112 when the character 112 is located at the center of the game screen at the time at which the dragging is terminated, or generates a hitting signal for the character 112 when the character 112 is located at the center of the game screen a preset time after the time at which the dragging is terminated.

That is, the hitting signal is generated at the time at which the attack signal is generated, or is generated a preset time after the time at which the attack signal is generated.

In this case, when the attack signal generated, a situation in which an arrow is shot is displayed on the game screen. Furthermore, when the hitting signal is generated, a situation in which the character 112 is hit is displayed on the game screen.

That is, when zooming-in or out is done by dragging the drag icon 132 and then the dragging is released, the attack signal is generated and an attack is made. In this case, it is preferable to display a situation in which an arrow is shot and a situation in which the character 112 is hit are displayed on the game screen at the same time, or to display a situation in which an arrow is shot on the game screen and then display a situation in which the character 112 is hit on the game screen after a preset time has passed.

Furthermore, the attack module 150 generates an attack signal by terminating the dragging in the state in which zooming-in has been achieved by dragging the drag icon 132, makes an attack, and then returns the drag icon 132 to its initial position.

In this case, the attack module 150 is configured to attack the character 112 if an attack signal is generated when the character 112 is located at the center of the game screen by the screen moving module 120, and to prevent an attack from being made on the character 112 if the attack signal is generated when the character 112 is not located at the center of the game screen.

Furthermore, the hitting signal varies the strength of the attack attributable to the attack signal depending on the level of the zooming or out of the focusing module 130. Furthermore, the strength of the attack is increased when zooming-in is performed, and is decreased when zooming-out is performed.

Furthermore, the attack module 150 generates a hitting signal when a specific region of the character 112 is located at the center of the game screen by the screen moving module 120, and then makes an attack on the character 112. The body of the character 112 is divided into regions, and reduction rates related to the strengths of attacks are applied. When a specific region of the character 112 is attacked, the strength of the attack is reduced at a reduction rate corresponding to the region, and then an attack having a reduced strength is made.

In this case, the character 112 is classified as a human or a horse, and a human is divided into the head, trunk, arm and leg of the human, and a horse is divided into the head, trunk and leg of the horse.

For example, a reduction rate of 0% may be assigned to the head of a human, a reduction rate of 40% may be assigned to the trunk of a human, and a reduction rate of 80% may be assigned to the arm and leg of a human, and a reduction rate of 50% is assigned to the head of a horse, a reduction rate of 70% is assigned to the trunk of a horse, and a reduction rate of 90% is assigned to the leg of a horse. In this case, 100 is subtracted from the status bar 152 displayed on the game screen when the head of a human is hit at an attack strength of 100, and a reduction rate of 40% is applied to the trunk of a human and thus 60 is deducted from the status bar 152 when the trunk of the human is hit at an attack strength of 100.

Furthermore, it is preferred that the hitting signal assign a module effect and an animation effect depending on a hit region of a character.

For example, it is preferable to provide the effect of increasing the variation in staggering for a specific time when the head of a horse is hit, or to provide the effect of performing rapid movement using the moving module for a specific time or the effect of changing the overall color of the game screen to red for a specific time when the head of the human is hit.

Furthermore, the game performing module 160 increases the variation in the staggering of the staggering module 140 and the sensitivity of the screen moving module 120 when the focusing module 130 performs zooming-in, and decreases the variation in the staggering of the staggering module 140 and the sensitivity of the screen moving module 120 when the focusing module 130 performs zooming-out.

In this case, the sensitivity is calculated by dividing the variation in location at the center of the game screen by the variation in the angle of the terminal.

Furthermore, the game performing module 160 performs control so that the character module 110 increases the speed of the character 112 when the focusing module 130 performs zooming-in and decreases the speed of the character 112 when the focusing module 130 performs zooming-out.

Furthermore, the game performing module 160 increases the variation in the staggering of the staggering module 140 and the sensitivity of the screen moving module 120 for a preset time when a specific gauge of the character 112 reaches a preset numerical value or when an attack is made using a specific item, at a specific location, using a specific skill or by a specific character 112.

Furthermore, the game performing module 160 includes an attack item 162 and an equipment item 164.

In this case, the attack item 162 is applied to another terminal that manipulates another character 112 when the other character 112 displayed on the game screen of the user's own terminal is hit.

The attack item 162 includes any of a first attack effect of decreasing the zoom-in and zoom-out speed of the focusing module 130, a second attack effect of increasing the variation in the staggering of the staggering module 140, a third attack effect of increasing the sensitivity of the screen moving module 120, a fourth attack effect of increasing the speed of movement of the user's own character displayed on another terminal, and a fifth attack effect of decreasing the strength of an attack attributable to an attack signal generated by another terminal, in which the strength of the attack is increased when zooming-in is performed and the strength of the attack is decreased when zooming-out is performed within the range from the strength of an attack that is achieved when the focusing module 130 performs maximum zooming-out to the strength of an attack that is achieved when the focusing module 130 performs maximum zooming-in.

Furthermore, the equipment item 164 is applied to the user's own terminal that manipulates the user's own character displayed on the game screen of the other terminal, thus being applied to the focusing module 130, the staggering module 140, the screen moving module 120, and the attack module 150.

The equipment item 164 includes any of a first equipment effect of increasing the zoom-in and zoom-out speed of the focusing module 130, a second equipment effect of decreasing the variation in the location of the staggering module 140, a third equipment effect of decreasing the sensitivity of the screen moving module 120, a fourth equipment effect of decreasing the speed of movement of the other character 112 displayed on the user's own terminal, and a fifth equipment effect of decreasing the strength of an attack attributable to an attack signal generated by another terminal, in which the strength of the attack is increased when zooming-in is performed and the strength of the attack is decreased when zooming-out is performed within the range from the strength of an attack that is achieved when the focusing module 130 performs maximum zooming-out to the strength of an attack that is achieved when the focusing module 130 performs maximum zooming-in.

Furthermore, it is preferred that the attack item 162 include items 167a and 167b that are applied to another terminal that manipulates another character 112, thereby providing various effects of changing color and inserting an obstacle into a game screen, thereby preventing accurate focusing on the game screen of the other terminal.

Furthermore, it is preferred that with regard to the attack item 162 and the equipment item 164, items 167a and 167b be displayed on the game screen during a game or be applied before the start of a game and then affect the other character 112 or the user's own character.

Furthermore, it is preferred that the user's own character not be displayed on the game screen of the user's own terminal, but displayed using only a numerical value.

Figure 5:
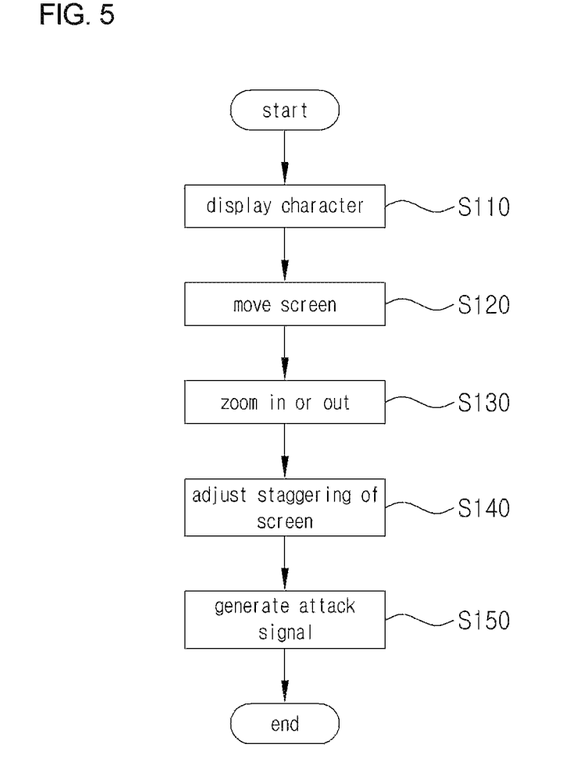
FIG. 5 is a flowchart illustrating a method of providing a shooting game recorded on a computer readable medium according to an embodiment of the present invention.

FIG. 5 is a flowchart illustrating a method of providing a shooting game recorded on a computer readable medium according to an embodiment of the present invention.

Referring to FIG. 5, first, a character is displayed on a game screen at step S110.

In this case, the location and speed of the character is adjusted by the character module and then displayed on the game screen.

Thereafter, the game screen is moved by rotating a terminal at step S120.

In this case, while the terminal is being rotated, a user aims at the character with an attack icon that is formed at the center of the game screen of the terminal.

Thereafter, zooming-in and out is performed by dragging the drag icon at step S130.

In this case, the zooming-in and out is performed via the focusing module, in which case through the user aims at a specific region of the character.

Furthermore, since the strength of an attack varies in the case of zooming-in or out, the user performs zooming-in or out in accordance with his or her own purposes.

As described above, the staggering of the game screen is adjusted at the same time that the zooming-in and out is performed at step S140.

In this case, the staggering module increases the variation in staggering of the character in the case of zooming-in, and decreases the variation in location of the character in the case of zooming-out.

Thereafter, an attack signal is generated by terminating the dragging at step S150.

In this case, the attack module generates an attack signal in a direction in which the attack icon is oriented at the same time that the dragging is determined and makes an attack. The status of the attack character is indicated on the status bar on the upper portion of the game screen in accordance with the reduction rate of the attacked region of the attacked character.

The above-described present invention provides the computer readable medium recording a shooting game, in which a strong attack can be made because a target is enlarged as in the zoom function of a camera and thus it is possible to more precisely view and then shoot a fatal point if an arrow displayed on a screen of a game is drawn for a long time, but it is difficult to hit the center of the screen because the center moves in sensitive response to the inclination of a terminal as the target is enlarged.

The present invention provides the computer readable medium recording a shooting game, which can differentiate a user who has frequently played the game and thus is accustomed to the adjustment of a target from a user who is not been accustomed to the adjustment of a target because, as the target is enlarged, a strong attack can be made but sensitivity to the inclination of a terminal is increased, thereby promoting immersion into the game.

The present invention provides the computer readable medium recording a shooting game, which can provide a staggering effect to a screen of a game using the staggering module as if a character rides a horse, thereby representing a shooting game in a more realistic manner.

The present invention provides the computer readable medium recording a shooting game, which applies the effects of various items to each module of the user's own terminal or another terminal, thereby increasing interest in the shooting game.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A non-transitory computer readable storage medium having stored thereon a program to execute a shooting game, wherein the program causes a processor of a game terminal to:

cause a character moving module to move a location of a character displayed on a game screen;

cause a screen moving module to sense movement of the terminal using a gyrosensor contained in the terminal including a touch screen and then move the game screen depending on a variation in an angle of the terminal;

cause a focusing module to sense dragging when a drag icon displayed on the touch screen is dragged;

cause an attack module to generate an attack signal to a center of the game screen at a time at which the dragging that is sensed by the focusing module is terminated;

cause a staggering module to stagger the game screen in vertical and lateral directions; and cause a game performing module to increase a variation in the staggering of the staggering module and a sensitivity of the screen moving module when the focusing module performs zooming-in, and to decrease the variation in the staggering of the staggering module and the sensitivity of the screen moving module when the focusing module performs zooming-out;

wherein the variation in staggering is a variation in staggering of the game screen in vertical and lateral directions;

wherein the sensitivity is a value that is obtained by dividing a variation in location at the center of the game screen by the variation in the angle of the terminal;

wherein the focusing module performs zooming-in around the center of the game screen when the drag icon is dragged;

wherein the drag icon performs zooming-in in proportion to a distance over which a drag pointer of the drag icon is dragged from its initial location; and wherein the attack module:
   generates a hitting signal for the character when the character is located at the center of the game screen at the time at which the dragging is terminated; or
   generates a hitting signal for the character when the character is located at the center of the game screen a preset time after the time at which the dragging is terminated.

2. The non-transitory computer readable storage medium of claim 1, wherein the attack module generates an attack signal by terminating dragging in a state in which zooming-in has been achieved by dragging the drag icon, makes an attack, and then returns the drag icon to its initial position.

3. The non-transitory computer readable storage medium of claim 1, wherein the focusing module generates an attack icon at the center of the game screen when the drag icon is dragged.

4. The non-transitory computer readable storage medium of claim 1, wherein the game performing module performs control so that the character module increases a speed of the character when the focusing module performs zooming-in and decreases the speed of the character when the focusing module performs zooming-out.

5. The non-transitory computer readable storage medium of claim 1, wherein the game performing module increases the variation in the staggering of the staggering module and the sensitivity of the screen moving module for a preset time when a specific gauge of the character reaches a preset numerical value or when an attack is made using a specific item, at a specific location, using a specific skill or by a specific character.

6. The non-transitory computer readable storage medium of claim 1, wherein:
   the game performing module further comprises:
      an attack item configured to be applied to another terminal that manipulates another character when the other character displayed on a game screen of a user's own terminal is hit; and
      an equipment item configured to be applied to the user's own terminal that manipulates a user's own character displayed on the game screen of the other terminal;
   the attack item includes:
      any of a first attack effect of decreasing a zoom-in and zoom-out speed of the focusing module, a second attack effect of increasing the variation in the staggering of the staggering module, a third attack effect of increasing the sensitivity of the screen moving module, and a fourth attack effect of increasing a speed of movement of the user's own character displayed on another terminal; and
   the equipment item includes:
      any of a first equipment effect of increasing the zoom-in and zoom-out speed of the focusing module, a second equipment effect of decreasing the variation in a location of the staggering module, a third equipment effect of decreasing the sensitivity of the screen moving module, and a fourth equipment effect of decreasing a speed of movement of the other character displayed on the user's own terminal.

7. The non-transitory computer readable storage medium of claim 6, wherein:
   the attack item further includes a fifth equipment effect of decreasing a strength of the attack attributable to an attack signal generated by the other terminal, in which the strength of the attack is increased when zooming-in is performed and the strength of the attack is decreased when zooming-out is performed within the range from the strength of an attack that is achieved when the focusing module performs maximum zooming-out to the strength of an attack that is achieved when the focusing module performs maximum zooming-in; and
   the equipment item further includes a fifth attack effect of decreasing a strength of the attack attributable to an attack signal generated by the other terminal, in which the strength of the attack is increased when zooming-in is performed and the strength of the attack is decreased when zooming-out is performed within the range from the strength of an attack that is achieved when the focusing module performs maximum zooming-out to the strength of an attack that is achieved when the focusing module performs maximum zooming-in.

8. The non-transitory computer readable storage medium of claim 1, wherein the hitting signal is such that a strength of an attack increases in proportion to the zooming-in of the focusing module and the strength of the attack decreases in proportion to the zooming-out of the focusing module.

9. The non-transitory computer readable storage medium of claim 1, wherein the screen moving module is configured such that the game screen is moved to a left when the terminal is rotated to the left, to a right when the terminal is rotated to the right, upward when the terminal is rotated upward, and downward when the terminal is rotated downward.

10. The non-transitory computer readable storage medium of claim 1, wherein the attack module generates a hitting signal when the character is located at the center of the game screen by the screen moving module, and then makes an attack on the character, in which case the character is divided, and reduction rates related to strengths of attacks are applied.

* * * * *